United States Patent
Cheng et al.

(10) Patent No.: US 9,331,860 B2
(45) Date of Patent: May 3, 2016

(54) VIRTUAL WORLD INTEGRATION WITH A COLLABORATIVE APPLICATION

(75) Inventors: Li-Te Cheng, Malden, MA (US); John F. Patterson, Carlisle, MA (US); Steven L. Rohall, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 12/017,016

(22) Filed: Jan. 19, 2008

(65) Prior Publication Data
US 2009/0187832 A1    Jul. 23, 2009

(51) Int. Cl.
G06F 3/048 (2013.01)
H04L 12/18 (2006.01)

(52) U.S. Cl.
CPC ....... H04L 12/1822 (2013.01); *A63F 2300/572* (2013.01)

(58) Field of Classification Search
CPC .................................................. H04L 12/1822
USPC .................................. 715/757, 753
See application file for complete search history.

(56) References Cited

U.S. PATENT DOCUMENTS

| | | | | |
|---|---|---|---|---|
| 6,594,673 | B1* | 7/2003 | Smith | G06F 17/30873 |
| 7,562,002 | B2* | 7/2009 | Rzevski | G06F 9/5027 |
| | | | | 700/248 |
| 9,026,458 | B2* | 5/2015 | Blatchley | G06Q 30/02 |
| | | | | 463/32 |
| 2002/0032037 | A1* | 3/2002 | Segawa | H04L 29/06 |
| | | | | 455/517 |
| 2004/0148221 | A1* | 7/2004 | Chu | A63F 13/12 |
| | | | | 705/14.51 |
| 2004/0193441 | A1* | 9/2004 | Altieri | G06Q 30/02 |
| | | | | 709/203 |
| 2006/0173703 | A1* | 8/2006 | Lee | G60Q 40/02 |
| | | | | 705/1.1 |
| 2007/0038559 | A1* | 2/2007 | Jung | G06Q 20/10 |
| | | | | 705/39 |
| 2008/0263460 | A1* | 10/2008 | Altberg | G06Q 30/02 |
| | | | | 715/757 |
| 2008/0268418 | A1* | 10/2008 | Tashner | G09B 7/00 |
| | | | | 434/365 |
| 2009/0019366 | A1* | 1/2009 | Abhyanker | G06Q 10/10 |
| | | | | 715/706 |
| 2009/0019367 | A1* | 1/2009 | Cavagnari | G06F 21/62 |
| | | | | 715/716 |
| 2009/0106347 | A1* | 4/2009 | Harwood | G06F 9/4445 |
| | | | | 709/203 |
| 2009/0112906 | A1* | 4/2009 | Shuster | A63F 13/12 |
| 2014/0016793 | A1* | 1/2014 | Gardner | H04M 3/56 |
| | | | | 381/63 |

OTHER PUBLICATIONS

Dossick, Stephen E., et al; CHIME: a Metadata-Based Distributed Software Development Environment; ACM SIGSOFT Software Engineering Notes; vol. 24, Issue 6 (Nov. 1999), pp. 464-475.

* cited by examiner

*Primary Examiner* — Anil Bhargava
(74) *Attorney, Agent, or Firm* — Steven M. Greenberg, Esq.; CRGO Law

(57) ABSTRACT

Embodiments of the present invention provide a method, system and computer program product for virtual world integration with a collaborative computing application. In an embodiment of the invention, a method for virtual world and collaborative computing application integration can be provided. The method can include loading a virtual world, detecting a posting in a collaborative application, and creating an object with the posting in the virtual world. The method further can include detecting a creation of an object in the virtual world including content, and creating a posting in the collaborative application with the content from the object in the virtual world. In one aspect of the embodiment, creating an object with the posting in the virtual world can include determining a topic for the posting, identifying a place in the virtual world corresponding to the topic, and creating the object in the identified place.

16 Claims, 1 Drawing Sheet

VIRTUAL WORLD INTEGRATION WITH A COLLABORATIVE APPLICATION

BACKGROUND OF THE INVENTION

1. Field of the Invention

The present invention relates to virtual reality and more particularly to virtual world management over a computer communications network.

2. Description of the Related Art

As the progenitor to the modern virtual world, the multi-user dungeon provided a revolutionary experience for its first participants more than three decades ago. The multi-user dungeon was and continues to be a multi-player computer game that combines elements of role-playing, first person shooter and social chat. The multi-user dungeon generally executes in a central server configured for simultaneous access by participants over a global computer communications network like the Internet. The multi-user dungeon historically has been text-driven where the immediate environment is presented to participants in text form, and participants engage in actions in the environment through textual directives mimicking the postings of an instant messenger. Non-player characters in the multi-user dungeon can be automated and the actions of the non-player characters can be broadcast to the participants also as textual postings.

Like a multi-user dungeon, virtual reality allows a user to interact with a computer-simulated environment; however in virtual reality, the virtual environment is visual in nature and can be displayed either on a computer screen or through customized or stereoscopic displays. Advanced modes of virtual reality further incorporate other sensory presentation elements, including audio elements and tactile elements. Generally, end-users interact with a virtual reality environment through traditional keyboard and mouse movements, though other input means are provided occasionally including gyroscopic handheld devices and gloves, and joysticks. Consistent throughout all virtual reality experiences, the virtual reality environment reflects the real world environment and has proven invaluable in commercial applications such as flight simulation or combat training.

The virtual world builds upon the multi-user dungeon and virtual reality in order to provide a computer-based simulated environment in which participants interact with one another through three-dimensional visually displayable surrogates referred to as avatars. In this regard, participants "inhabit" the virtual world through their respective avatars. In as much as avatars can freely roam the bounds of the virtual world, virtual worlds expand the boundaries of the multi-user dungeon and permit participants to truly enjoy freedom of motion and exploration within the virtual world. To date, virtual worlds have become such close approximations to reality that the lines of reality have become blurred to the extent that many participants treat ordinary interactions in the virtual world with the same degree of seriousness as those same interactions in the real world.

The virtual world has found application expressly and exclusively for the purpose of socializing and gaming. The most common social application of the virtual world is the "Second Life" online virtual world manufactured by Linden Lab of San Francisco, Calif., United States. By comparison, the most common gaming application of the virtual world is the "World of Warcraft" gaming environment published by Blizzard Entertainment of Irvine, Calif., United States. In either circumstance, creating fanciful artifacts like buildings and personal property within a virtual world remains central to the virtual world experience. In contrast, in the productive environment of the collaborative computing application, minimizing artifacts like messages, calendared events, activities and postings is at the heart of the efficiencies gained through the use of a collaborative computing application.

BRIEF SUMMARY OF THE INVENTION

Embodiments of the present invention address deficiencies of the art in respect to virtual words and provide a novel and non-obvious method, system and computer program product for virtual world integration with a collaborative computing application. In an embodiment of the invention, a method for virtual world and collaborative computing application integration can be provided. The method can include loading a virtual world, detecting a posting in a collaborative application, and creating an object with the posting in the virtual world. The method further can include detecting a creation of an object in the virtual world including content, and creating a posting in the collaborative application with the content from the object in the virtual world. In one aspect of the embodiment, creating an object with the posting in the virtual world can include determining a topic for the posting, identifying a place in the virtual world corresponding to the topic, and creating the object in the identified place.

In another embodiment of the invention, a virtual world data processing system can be provided. The system can include a virtual world server executing in a host server and a collaborative application executing in another host server. The collaborative application can include, for example a discussion forum, a wiki, a blog or a team space. The system also can include an intermediary communicatively coupled to both host servers. The intermediary can include program code enabled to detect a posting in the collaborative application and to create an object with the posting in the virtual world. Further, the program code of the intermediary can be enabled to detect a creation of an object in the virtual world including content and to create a posting in the collaborative application with the content from the object in the virtual world.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for virtual world integration with a collaborative computing application. In accordance with an embodiment of the present invention, a collaborative application and a virtual world can be communicatively linked together through an intermediary. The intermediary can identify postings to the collaborative application and create objects in the virtual world to reflect the postings. Correspondingly, the intermediary can identify the creation of objects in the virtual world and can create postings in the collaborative application to reflect the objects. In this way, the benefit of the virtual world can be integrated with and extended to the collaborative application.

Figure 1:
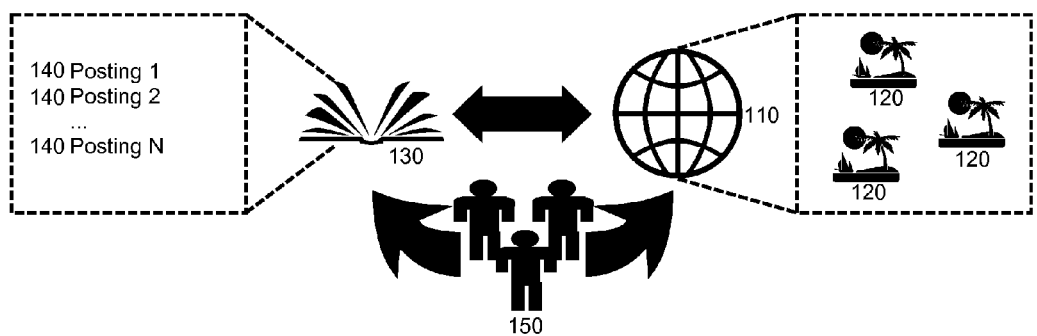
FIG. 1 is a pictorial illustration of a process for virtual world integration with a collaborative computing application.

In further illustration, FIG. 1 pictorially depicts a process for virtual world integration with a collaborative computing application. As shown in FIG. 1, a virtual world 110 can provide multiple different places 120 such as offices, storefronts, houses, apartments and even entire geographic regions such as islands. Each of the places 120 can include multiple different objects including furniture, wall art, posters, and the like. End users 150 can interact with the places 120 in the virtual world 110 through respective avatars. Further, end users 150 can create new places 120 in the virtual world 110 and also end users 150 can create new objects in those places 120.

A collaborative application 130 also can be provided. The collaborative application 130 can include by way of example a Wiki, a Blog, a discussion forum, a team space and the like. End users 150 can interact with the collaborative application 130 by providing postings 140 to the collaborative application 130. The postings 140 can include text, audio, video, imagery or any combination thereof. Notably, postings 140 provided to the collaborative application 130 can be synchronized to the places 120 in the virtual world 110. In this regard, postings 140 pertaining to a particular topic of interest in the collaborative application 130 can be represented in the virtual world 110 as an object in a place 120 corresponding to the particular topic of interest. The object can include, for example, a note, poster, bulletin board, white board or billboard in the place 120.

Figure 2:
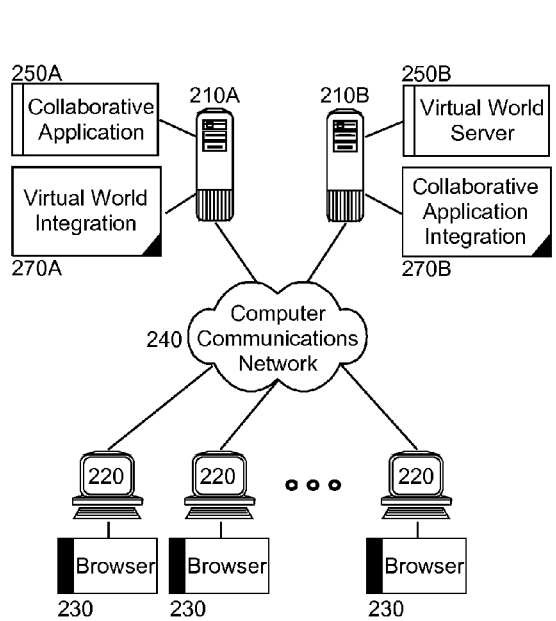
FIG. 2 is a schematic illustration of a virtual world data processing system configured for collaborative computing integration; and, FIG. 3 is a flow chart illustrating a process for virtual world integration with a collaborative computing application.

The process described herein can be performed in a virtual world data processing system. In illustration, FIG. 2 schematically depicts a virtual world data processing system configured for collaborative computing integration. The system can include different host servers 210A, 210B, each configured for coupling to different clients 220 over computer communications network 240. Host server 210A can host the operation of a collaborative application 250A, while host server 210B can host the operation of a virtual world server 250B. The clients 220 in turn can provide respective content browsers 230 through which end users can interact with the collaborative application 250A and the virtual world server 250B.

Notably, virtual world integration logic 270A can be coupled to the collaborative application 250A. The virtual world integration logic 270A can include program code enabled to detect a posting to the collaborative application 250A in response to which the program code can be further enabled to create or modify an object in the virtual world server to reflect the posting. Likewise, collaborative application integration logic 270B can be coupled to the virtual world server 250B. The collaborative application integration logic 270B can include program code enabled to detect the creation of an object in the virtual world server 250B in response to which the program code can be further enabled to create a posting in the collaborative application server to reflect the object.

It will be recognized by the skilled artisan that the virtual world integration logic 270A and the collaborative application integration logic 270B can be combined as an intermediary in a single program unit executing either in the host server 210A, the host server 210B, or in a separate host server communicatively coupled to the host servers 210A, 210B. Further, the integration described herein can be a one-way integration such that only the virtual world integration logic 270A or the collaborative application logic 270B need be present as an intermediary. Alternatively, two-way integration can require both the virtual world integration logic 270A and the collaborative application logic 270B, each acting as a separate intermediary.

Figure 3:
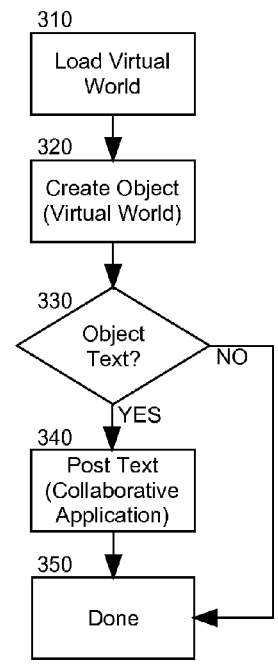

In yet further illustration of the one-way integration of a collaborative application with a virtual world, FIG. 3 is a flow chart illustrating a process for virtual world integration with a collaborative computing application. The process can begin in block 310 with the loading of a virtual world 310 including different places and objects within the places. In block 320, an object can be created in the virtual world and in block 330, it can be determined whether or not the created object includes content such as text, audio, video or imagery, suitable as a posting in a corresponding collaborative application. If so, in block 340 a posting can be created for the content and the process can end in block 350.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for virtual world and collaborative computing application integration, the method comprising:
    executing an intermediary as a single program unit in memory of a host server, the intermediary comprising both virtual world integration logic and also collaborative application integration logic and separately executing in the memory of the host server from both the virtual world and the collaborative application;
    establishing a communicative linkage between the virtual world and a collaborative application by way of the intermediary by coupling the virtual world integration logic of the separately executing intermediary to the virtual world and by coupling the collaborative application integration logic of the separately executing intermediary to the collaborative application;
    detecting in the collaborative application integration logic of the intermediary a posting in the collaborative application; and,
    creating by the virtual world integration logic of the intermediary an object with the posting in the virtual world, the creating and detecting providing for a two-way integration of the virtual world and the collaborative application, the two-way integration being achieved by additionally detecting by the virtual world integration logic of the intermediary a creation of an object in the virtual world including content and creating by the collaborative application integration logic in the intermediary a posting in the collaborative application with the content from the object in the virtual world.

2. The method of claim 1, wherein the collaborative application is a discussion forum.

3. The method of claim 1, wherein the collaborative application is a Wild.

4. The method of claim 1, wherein the collaborative application is a blog.

5. The method of claim 1, wherein the collaborative application is a team space.

6. The method of claim 1, wherein creating an object with the posting in the virtual world comprises:
    determining a topic for the posting;
    identifying a place in the virtual world corresponding to the topic; and,
    creating the object in the identified place.

7. A virtual world data processing system comprising:
    a virtual world server executing in a host server and a collaborative application executing in another host server; and,
    an intermediary executing as a single program unit comprising both virtual world integration logic and also collaborative application integration logic and separately executing from both the virtual world and the collaborative application, the intermediary coupling the virtual world integration logic of the separately executing intermediary to the virtual world and coupling the collaborative application integration logic of the separately executing intermediary to the collaborative application the intermediary comprising program code to detect through the collaborative application integration logic a posting in the collaborative application and through the virtual world integration logic to create an object with the posting in the virtual world, the creating and detecting providing for a two-way integration of the virtual world and the collaborative application, the two-way integration being achieved by additionally detecting by the virtual world integration logic of the intermediary a creation of an object in the virtual world including content and creating by the collaborative application integration logic in the intermediary a posting in the collaborative application with the content from the object in the virtual world.

8. The system of claim 7, wherein the collaborative application is a discussion forum.

9. The system of claim 7, wherein the collaborative application is a Wild.

10. The system of claim 7, wherein the collaborative application is a blog.

11. The system of claim 7, wherein the collaborative application is a team space.

12. A computer program product comprising a computer readable storage medium storing computer usable program code for virtual world and collaborative computing application integration, the computer program product comprising:
    computer usable program code for executing an intermediary as a single program unit in memory of a host server, the intermediary comprising both virtual world integration logic and also collaborative application integration logic and separately executing in the memory of the host server from both the virtual world and the collaborative application;
    computer usable program code for loading a virtual world;
    computer usable program code for establishing a communicative linkage between the virtual world and a collaborative application by way of the intermediary by coupling the virtual world integration logic of the separately executing intermediary to the virtual world and by coupling the collaborative application integration logic of the separately executing intermediary to the collaborative application;
    computer usable program code for detecting in the collaborative application integration logic of the intermediary a posting in the collaborative application; and,
    computer usable program code for creating by the virtual world integration logic of the intermediary an object with the posting in the virtual world, the creating and detecting providing for a two-way integration of the virtual world and the collaborative application, the two-way integration being achieved by additionally detecting by the virtual world integration logic of the intermediary a creation of an object in the virtual world including content and creating by the collaborative application integration logic in the intermediary a posting in the collaborative application with the content from the object in the virtual world.

13. The computer program product of claim 12, wherein the collaborative application is a discussion forum.

14. The computer program product of claim 12, wherein the collaborative application is a Wild.

15. The computer program product of claim 12, wherein the collaborative application is a blog.

16. The computer program product of claim 12, wherein the collaborative application is a team space.

* * * * *